(12) United States Patent
Daneshvar

(10) Patent No.: US 8,822,885 B2
(45) Date of Patent: Sep. 2, 2014

(54) MODERN KORSI AND METHODS

(76) Inventor: Yousef Daneshvar, West Bloomfied, MI (US)

( * ) Notice: Subject to any disclaimer, the term of this patent is extended or adjusted under 35 U.S.C. 154(b) by 159 days.

(21) Appl. No.: 11/581,045

(22) Filed: Oct. 13, 2006

(65) Prior Publication Data

US 2010/0000714 A1    Jan. 7, 2010

Related U.S. Application Data

(60) Provisional application No. 60/726,429, filed on Oct. 14, 2005.

(51) Int. Cl.
*A47B 3/06* (2006.01)
*A47B 3/08* (2006.01)
*A47B 3/12* (2006.01)
*A47B 13/08* (2006.01)
*F24D 13/00* (2006.01)
*F24D 15/02* (2006.01)
*A47C 7/74* (2006.01)

(52) U.S. Cl.
USPC ........... 219/218; 219/217; 108/115; 108/124; 108/128; 108/132

(58) Field of Classification Search
USPC .......... 219/217, 218, 211, 212; 108/115, 128, 108/132, 147, 36, 79
See application file for complete search history.

(56) References Cited

U.S. PATENT DOCUMENTS 1,072,550 A * 9/1913 Wilson ...................... 108/159.12
1,877,654 A * 9/1932 Flink et al. .................... 108/129

(Continued)

FOREIGN PATENT DOCUMENTS

JP       09196380 A    *  7/1997
JP    2000074375 A    *  3/2000
JP    2002233422 A    *  8/2002

OTHER PUBLICATIONS

Machine translation of Japan patent No. JP09196380, Feb. 2011.*

*Primary Examiner* — Joseph M Pelham

(57) ABSTRACT

This invention is related to the conservation of energy. The energy sources are limited and energy usage can cause environmental problems. This invention introduces a method of heating which is small and effective. In this method instead of heating the whole house which expensive and at times uncomfortable a limited heated space under a table means covered with a cover means is introduced that allows a person to warm up his/her body. Also, heating a smaller space can be done quickly and uses a limited energy, which is thus more cost-effective. This unit is designed to fold to a smaller unit for easy storage. In this method, an adjustable table means holds an electrical heating means under a cover and allows the person to use that limited space as heating source. The heating means has its control means and thermostat in order to keep the temp in a desired level. The table is very versatile and allows its dimensions to be changed easily so that the user has the option of choosing a size that fits its need. The unit also provides means for sitting and holding the feet comfortably. The unit also introduces a cover and a heating means for the user's back. This unit allows the persons to have a source of heat that can be set up easily, warm up quickly and to use minimal energy. It can also be stored in a very small space. The use of these units can be life saving in man made or natural tragedies in cold weather.

19 Claims, 12 Drawing Sheets

(56) References Cited

U.S. PATENT DOCUMENTS

| | | | |
|---|---|---|---|
| 1,997,182 A * | 4/1935 | Peck | 108/159 |
| 2,960,986 A * | 11/1960 | Gibbons | 607/81 |
| 3,079,167 A * | 2/1963 | Russell | 280/641 |
| 3,079,875 A * | 3/1963 | Hasler | 108/38 |
| 4,341,164 A * | 7/1982 | Johnson | 108/67 |
| 4,449,034 A * | 5/1984 | Taniguchi | 219/217 |
| 4,937,903 A * | 7/1990 | Joly et al. | 5/414 |
| 4,938,153 A * | 7/1990 | Maes | 108/128 |
| 5,345,881 A * | 9/1994 | Loescher | 108/132 |
| 5,788,789 A * | 8/1998 | Cooper | 156/64 |
| 5,794,546 A * | 8/1998 | Carter | 108/115 |
| 5,805,767 A * | 9/1998 | Jouas et al. | 392/373 |
| 5,943,968 A * | 8/1999 | Dobson et al. | 108/124 |
| 6,124,578 A * | 9/2000 | Elliot | 219/528 |
| 6,730,881 B1 * | 5/2004 | Arntz et al. | 219/400 |
| 6,997,111 B2 * | 2/2006 | Giegerich | 108/25 |
| 7,183,519 B2 * | 2/2007 | Horiyama et al. | 219/217 |
| 2003/0089286 A1* | 5/2003 | Wang | 108/128 |
| 2004/0123780 A1* | 7/2004 | Butts, Jr. | 108/26 |

\* cited by examiner

MODERN KORSI AND METHODS

This application claims the benefit of U.S. Provisional application No. 60/726,429 filed on Oct. 14, 2005.

THE BACKGROUND OF THIS INVENTION

This invention is related to the conservation of energy and providing heat in an economical fashion. Energy resources are limited and its production has various problems, including environmental aspects. This invention introduces a method of heating the body through use of a small, covered space which will be cost efficient. Commonly in the western world, people heat the whole house in cold weather, however, this method is expensive and at times even uncomfortable. It is known that people's body metabolisms are different, so when the temperature of the room is comfortable for one person, it can be warm or cold for another. It is in practice not possible to warm up a room for comfort of everyone individually. Simultaneously, keeping the whole house warm would need a closed space which prevents ventilation of the area in an inexpensive manner. The method provided in this application promotes the use of a limited heated space that allows the person to sit and warm up his/her body without the need of heating the whole space to a higher degree. Also, the heating of a smaller space can be done quickly which would help the user and by using a lesser amount of energy it is more cost-effective. The other advantage of this unit is that it is designed to be stored easily and in a small space which is beneficial in its own right. Imp, these units allow a very rapid delivery of heating aids to the disaster areas around the world and save many lives of the victims.

THE BRIEF EXPLANATION OF THE INVENTION

This method consists of an adjustable table that holds an adjustable, electrical heating means under a cover and allows the person to use that limited space as a heating source. The heating means has its control means. The table is very versatile and allows its dimensions to be changed easily so that the user has the option of choosing a size that fits its need. Importantly, this method allows the unit to be folded into a small flat body to be easily stored. The unit also provides the means for sitting and relaxing the feet comfortably. The unit also introduces a cover and a heating means for the back and the sides of the user. In brief, this unit allows the person to have a source of heat that can be set up easily, warmed up quickly, uses little energy and can be stored in minimal space.

BRIEF EXPLANATION OF THE FIGURES

Please note that some parts of this invention are shown in different figures, for preventing a crowded figures. Please also note that many of the options shown in different figures can be combined to be used in a single model.

DETAILED EXPLANATION OF THE FIGURES

Figure 1:
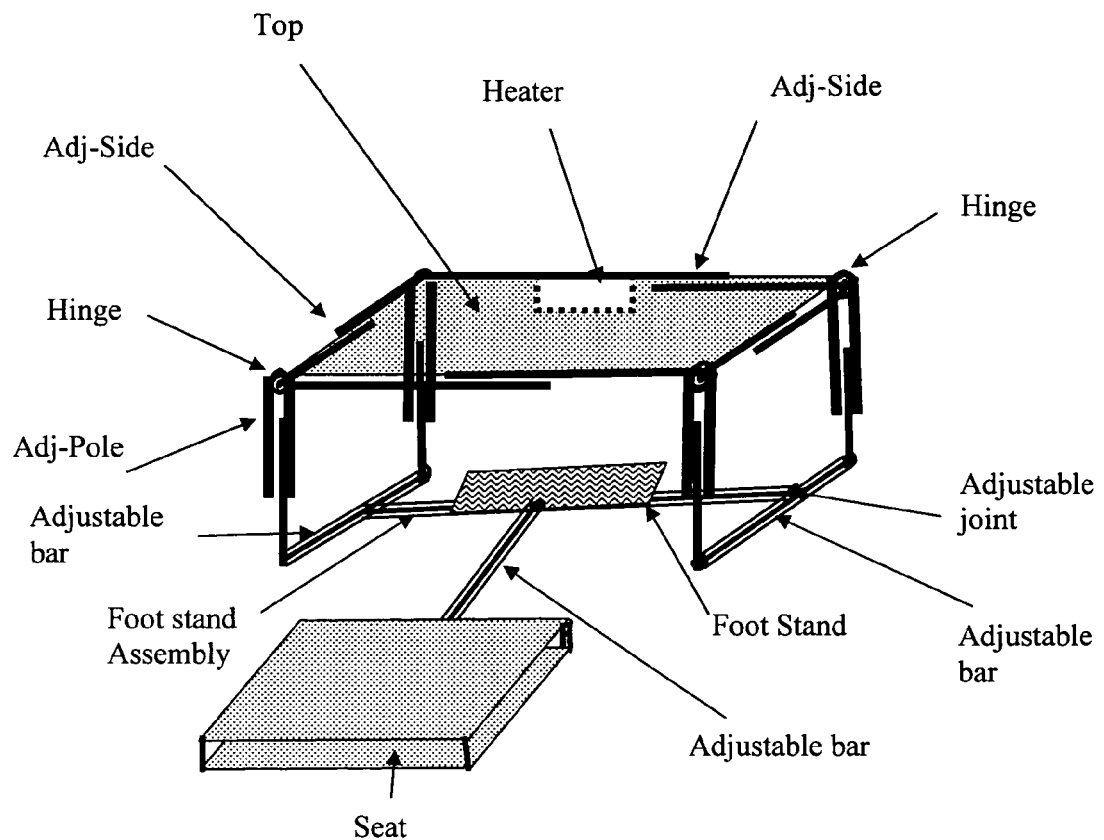
FIG. 1. Shows the general view of a Modern Korsi; an adjustable table, a heater, a seat and a foot stand.
Figure 2:
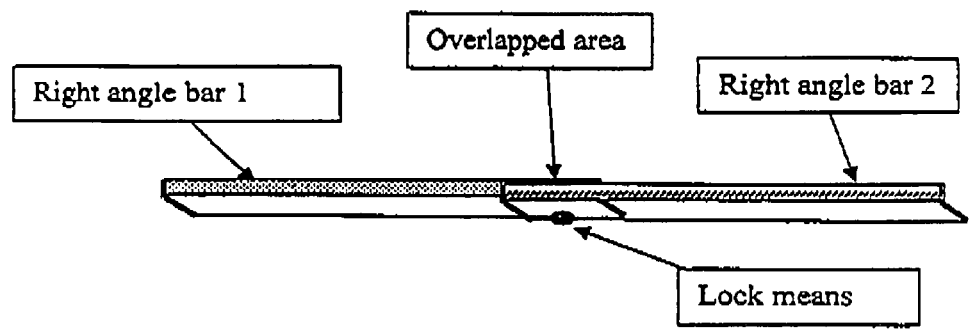
FIG. 2. Shows an adjustable side for the table, made of combination of two, right angle metal bars, with a locking means.
Figure 3A:
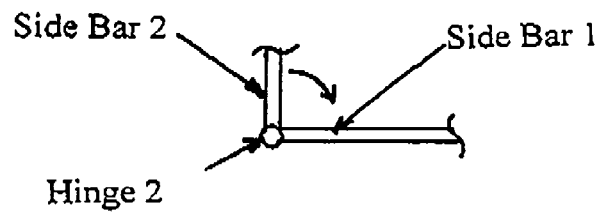
FIG. 3A is a fragmentary view in the direction of arrow 3A in FIG. 3.
Figure 3:
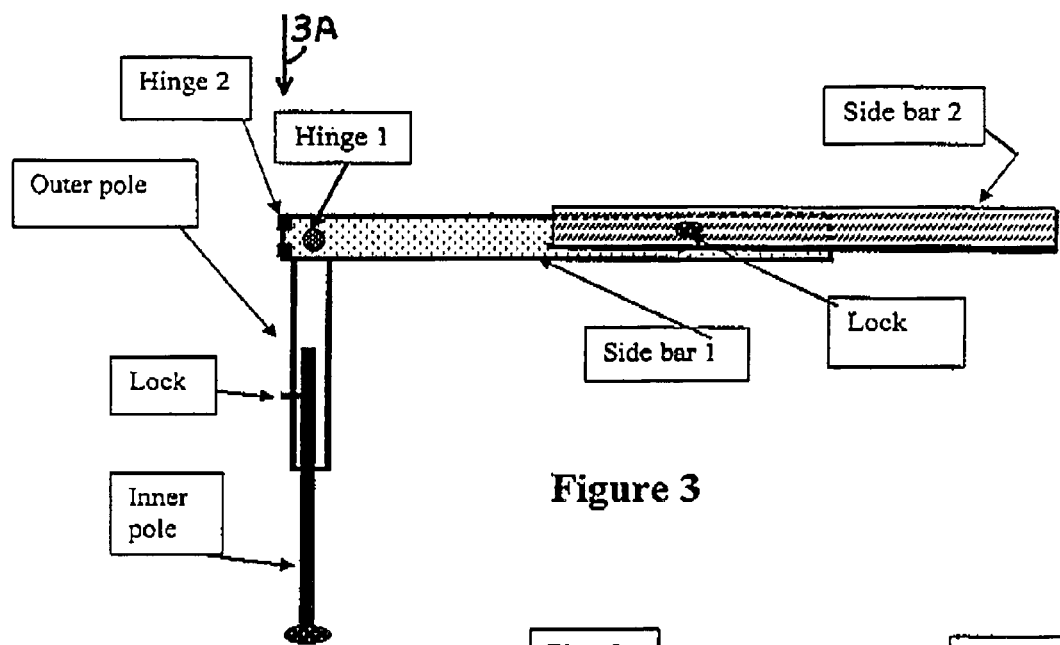
FIG. 3. Shows an adjustable pole hinged to the side bars.

FIG. 1. This figure shows the prototype of a Modern Korsi which consists of:

1. A table type unit which has an adjustable flat top, Top. This top can be made from combinations of more than one pieces. So that the size of the top can be modified both in width and length easily.
2. An adjustable frame in the periphery of the top of the table that allows the width and length of the table to be adjusted in order to fit the size which the user needs. Each sides of the frame of this table consist of pieces that are adjustable, as shown at FIGS. 2 and 3, so that one piece will move along the other and allows the length of the combination to be adjusted. A fixing means will keep the final length of the sides stable and prevent it from moving. Thus, a side of the top of the table can be adjusted to be long or short as desired. In the prototype model shown at FIG. 2, the side piece is made of combination of two metal, right angle bars, which the second piece, Right angle bar 2 slides on the first piece, Right angle bar1. The unit has a locking means, Lock means that will keep the final position in a secure status. This method will make the length of the combination to be controllable. The top frame of the table will have four sides made of similar combinations so that the final frame will have borders that their lengths are adjustable. Importantly, the ends of the sides will be hinged to each other so that the sides can be folded one on another for the storage.

Figure 8:
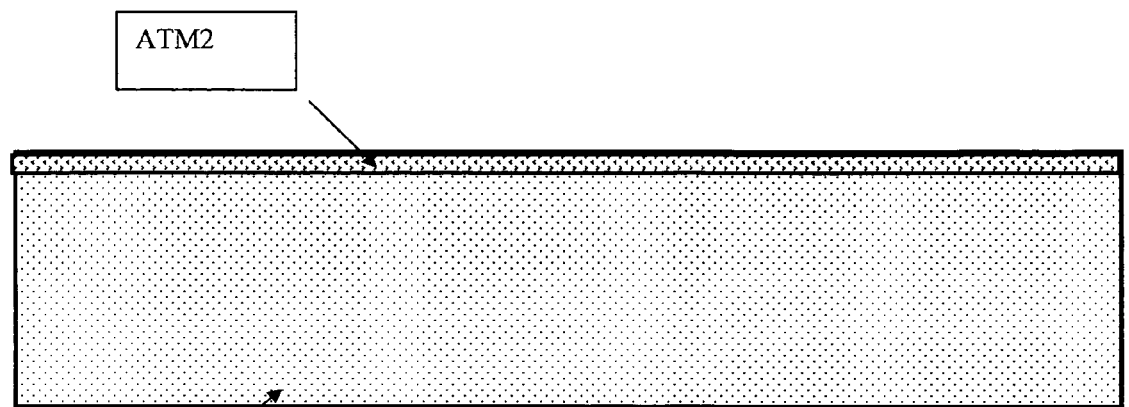
FIGS. 8 and 8A shows a modified version of this unit for use in computer table or desks.

The top frame when assembled will allow the flat top means of the table to be placed inside the frame securely. The horizontal part of the bars will prevent the top means from falling and the vertical parts of the bars will prevent the top means from moving out. The top frame may have extra pieces of flat bars in order to provide more strength and stability. These bars are to connect to the sides of the peripheral bars in order to allow the top of the table to tolerate more weight.
3. Also importantly, the unit to have a means of cover that will cover up to three sides of the table means so that only one side of the table will be open for the use. This can be:
   a. One large cover means for the sides of the table means as shown at FIG. 8 which will be sized enough to cover the three sides of the table in its largest size.
   b. Three smaller sized cover means for the sides of the table means similar to the unit shown at FIG. 8 which will be sized enough to cover only one side of the table means in its largest size. The extra lengths will drop in floor and also can be folded. These cover means will have attachment means that will attach them to the sides of the table means easily. Importantly, this method allows the unit to be very much ready for a quick set up when needed.

This method leaves one open side that can be covered with a blanket or a favored cover means that the person likes to use for this purpose.

Importantly, the table means may have attachment means such as hooks or hook and loop means that can be attached to the blanket in order to keep it in place.

Importantly, the cover means for the sides will be properly chosen to be flame retardant and also to prevent heat from escaping.

Importantly, the cover means for the sides can be made to be also blanket means so the user has the option of getting a unit that is useable from one side or also from all four sides.

Figure 8A:
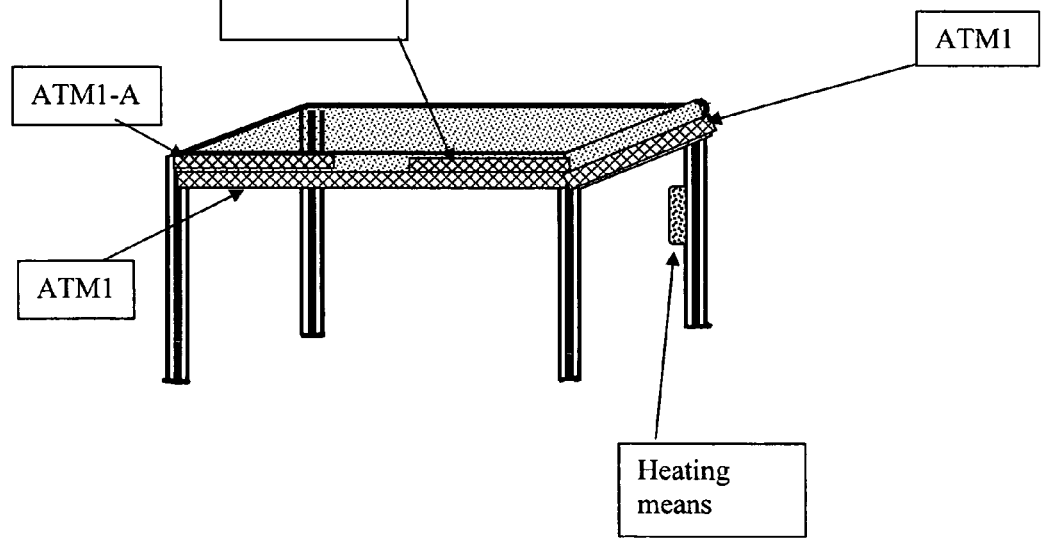

Importantly, the sides of the table means may have attachment means as shown at FIG. 8A so that it allows the cover means for the sides and even the front to be easily attachable to the table means.

Alternatively, the cover means may have attachment means that allows them to be attached to each other in order to cover the table means.

Thus, the cover means will be made to be adjustable and easily managed in order to cover the sides and even the top of the table means and make a nice and easily manageable unit.

FIG. 2. Shows a side piece made of combination of two metal, right angle bars, which the second piece, Right angle bar 2 slides on the first piece, Right angle bar1. The unit has a locking means, Lock means that will keep the final position in a secure status. This method will make the length of the combination to be controllable. The top frame of the table will have four sides made of similar combinations so that the final frame will have borders that their lengths are adjustable. Importantly, the ends of the sides will be hinged to each other so that the sides can be folded one on another for the storage.

FIG. 3. Shows an adjustable pole which allows the height of the table means to be adjusted from the floor. This pole is hinged to one of the two side bars, Side bar 1. In this model the pole consists of a smaller pole that fits into a larger pole and moves along in and out, so the combination makes an adjustable pole. A fixing means, Lock will keep the final length stable and prevents it from moving. The fixing means can be a retractable pin on the inner pole which will pop out and fit inside one of the holes of the outer pipe to keep the length stable after the final length is chosen. This pole is hinged to the Side bar 1 of the table means by Hinge 1, so that the pole can be folded toward the Side bar 1. Also the Hinge 2 allows the second side bar, Side bar 2 of the adjoining side, to fold over the Side bar 1 as suggested by the arrow in FIG. 3A. This method and means allows these pieces to fold over each other and be stored in a small space such as the surface of the table top when it is disassembled.

Figure 4:
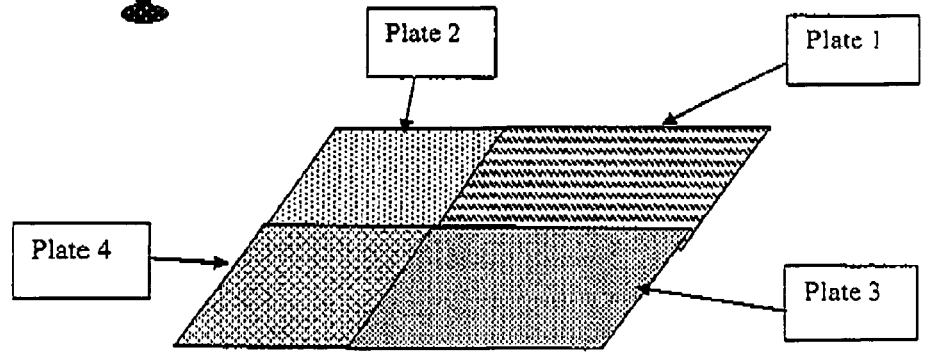
FIG. 4. Shows an adjustable surface for the top of the table.

FIG. 4. Shows four similar flat plates, Plate 1, Plate 2, Plate 3 and Plate 4 which are made of a rigid material such as metal, or other rigid man-made materials, so they can slide over each other to allow the size of the combination to be adjustable. Thus, the size may vary from the size of one of them to a size which is about four times of one of the plates. These plates will be placed on the top of the table and be kept stable by use of extra bars and will be kept in a fixed position through use of attachment means such as screws.

Figure 5:
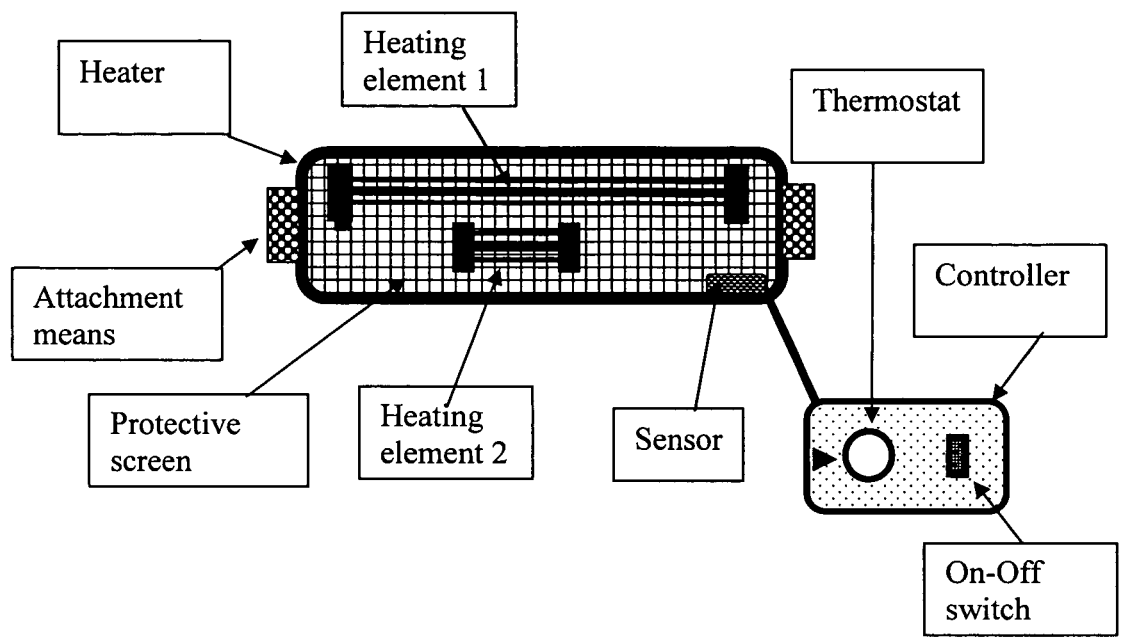
FIG. 5. Shows a heating means protected by a screen.

FIG. 5. Shows a heater means which consist of a case that holds one or more heating means or elements, Heating element 1 and Heating element 2 securely mounted on the base and protected by a screen, Protective screen so that the protective screen will prevent from the body of the users or the covers etc. to come in contact with the heating element. Importantly, this screen will allow the air to move in order to have its volatile gas molecules to come in contact with the heating element and be burned out to keep the area sanitized. The heater has a thermostat, Thermostat which is connected to a controller, Controller. Importantly, the controller is attached with a wire so that it can be controlled from outside the covered area for convenience, since it would otherwise be hard to access the heater in order to adjust the heat level. It is possible to use wireless means to control different functions of the heater. A sensor, Sensor in the heater allows the temperature under the M-Korsi to be known, by the system and adjusted by the thermostat, Thermostat. The controller may also have a timer in order to allow it to be timed so that the unit will turn on and off in a designed fashion. Importantly, the heater may have two sources of heat, first, a more potent unit for the initiation of heat when the M-korsi is cold and there is a need for a rapid warming, shown at Heater element 1 and the second unit, Heater element 2 which is smaller in order to maintain a low level heat so that it will not be dangerous if on for a longer time. Each one of these will have their own controller, so that the user can turn off the rapid heater and leave the slow heater on or connect them to a timer separately as they wish. The unit may have a timer as part of the controller that allows the time for turning on and off to be chosen.

Importantly, the first heater, Heating element 1 is designed so that it will be turned on only for a brief period of time and will shut off automatically. This will turn on manually or by a very strict and controlled program and sensing means so that it can not be left in an on position for a long time in a hot heat that can initiate fire. This is a safety means to make the unit safe and prevent a fire.

The issue of having two source of the heat is very important for various reasons:
1. It prevents the rapid increase and decrease of the heat which is more comfortable for the user.
2. It allows more peace of mind to the user when they can turn off the rapid heater off and leave the house while they leave the low level heater on for maintaining the heat. The low level heater per design will not be able to initiate a fire.
3. The second heater may be chosen to be a light bulb so that it can be changed easily and also provide constant low-level heat.
4. This method gives more options to the user.

The thermostat, Thermostat will control the temp inside the M-Korsi to a predesigned level.

Figure 7:
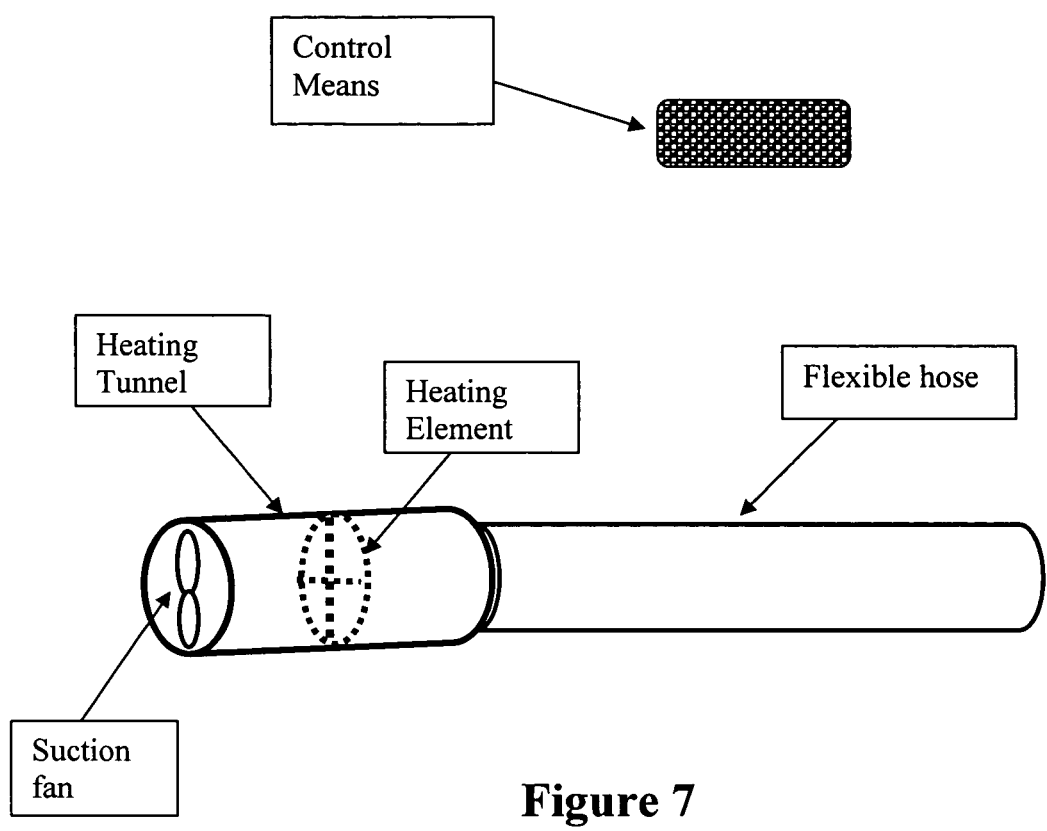
FIG. 7. Shows a suction means with a heating means and a flexible hose.

The unit may also be equipped with other means of controlling the volatile and odorous gases, so that the area will be controlled. This may consist of one or more of the following:
A. A red-hot source of heat of various nature and shapes protected by screens so that it will burn the molecules of the volatile gases per contact. In a prototype form, it will be a coil of red heat.
B. A suction fan designed to suction air from the covered area of the M-Korsi and move it through a flexible hose into a tunnel which has a red hot element, as shown at FIG. 7. During this journey the molecules of the volatile gases will be burned out and the air will be warmed and purified.
C. The suction fan may be also used to suction the air from the covered area of the M-Korsi and expel to a proper area by use of a flexible hose. So that the polluted air will be out. A switch will control the heating element of this unit to prevent the wasting of heat.
D. Any other means of purification may be used as well.

Importantly, in some models the heating means will be made from combinations of lamps that will be used to produce heat.

6. The M-Korsi is fortified by use of a foot stand shown at FIGS. 1 and 6 which allows the sitting person to put his/her feet against the foot stand in order to be in natural comfortable position and prevent the foot from being stressed out. Without the foot stand, the ankle might be over extended and the feet may slide and create fatigue and pain. An example of this part is shown in more details at FIG. 6. In this figure the foot stand is shown at Foot stand.

The foot stand will be adjustable and a control means, Control means allows the angulation of the foot stand to be adjusted:
   a. In its position so that it can be moved forward and backward. b. In its angulation so that it can be more vertical or horizontal.
   c. In its position from left to right.

Also, the unit may be made to be free and allow the angulation to be chosen by the foot position by having the foot stand to have hinges in its sides, to allow it to rotate.

Importantly, the heater means may be equipped with safety means to turn off the heat source if the unit is tilted to prevent fire if the unit was accidentally knocked over.

Importantly, the heater means may be made from a stronger heat element of source with a controller that is able to be programmed.

I. A first choice that will provide short periods of stronger heat in order to raise the temperature from a lower level to the desired level in short time and then to shut off automatically. This will turn on manually or by a very strict and controlled program and sensing means so that it can not be left in an on position for a long period of time to produce a high level of heat that can potentially initiate fire. This is designed for making the unit safe and prevent fire.

II. A second choice that provides a longer periods of low grade heat in order to keep the temperature under the covered area all along and to shut off automatically when the heat reaches over the desired level. This temperature will not be able to reach a level that can start fire even if left on constantly. Thermostats and automatic shot off means will be utilized in order to make the heating means safe and fireproof.

Figure 6:
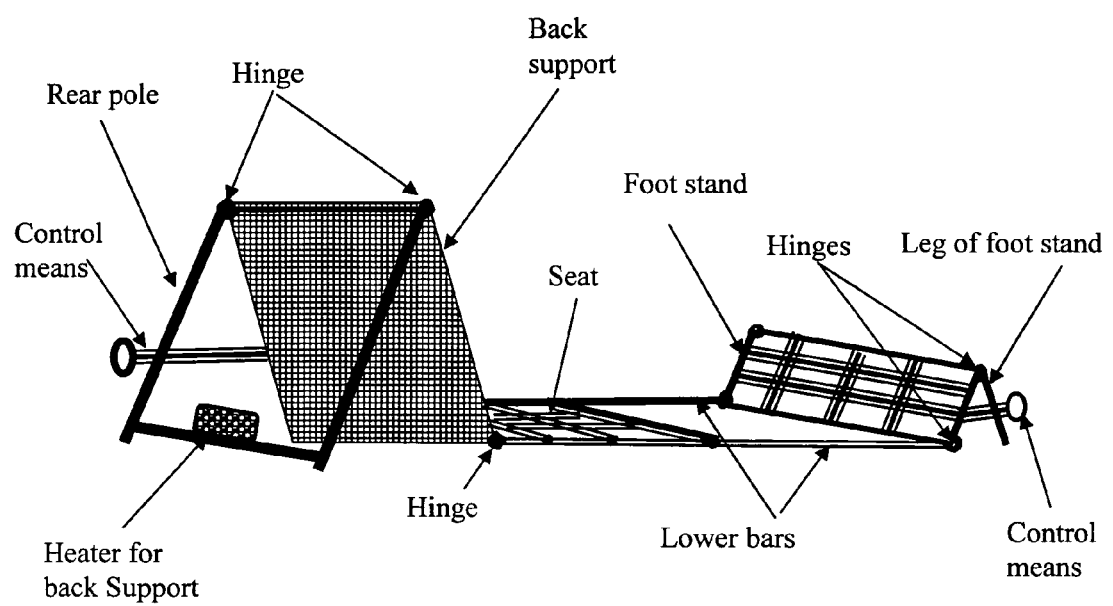
FIG. 6. Shows a back stand with its own heater and an adjustable foot stand attached to it.

FIG. 6. This figure shows an adjustable back support for use with this unit. The back support allows the person to sit comfortably when the M-Korsi is placed in a large room and its back is not against a wall or support. It can also provide heat to the back and sides to make the unit more efficient and comfortable. This part consists of a shaped, rather flat piece, Back support, designed to stand in the back of the person and is hinged by hinges, Hinge to the foot assembly from its lower side and from its top side will be also hinged to a control and stabilizing means which consist of poles, shown at Rear Pole in the rear of the back support. This design allows the angulation of the back piece to be modified so that the back piece, Back Support can be more vertical or more supine. A control means, Control means will keep the back support and the pole means in an adjustable and stable status. A lumbar support pad means, not shown in this figure may be attached to the back piece on optional basis.

The back support may have its own heating means, Heater, so that the back support, Back support will be warmed. The heating means may be contained under a resilient, thermally insulated cover, only to allow the heat to be transmitted toward the back/also to sides of the person. The heating means for the back support can be of any heating means including an electrical heating source, heating blanket, etc.

The unit may combine a blanket means or cover means to cover the back area and the sides in order to provide a more complete heating to the back and sides of the body as needed. Importantly, the unit may also have an extension of cover in order to go over the shoulders, neck and head as well if the circumstance requires and also to move forward to keep the air warm in front of the mouth if the outside air is too cold to breathe. These units will be useful in rural areas or conditions where the outside air is very cold and there is a need for a more comprehensive heating means. The presence of back support and further heating means will make the M-Korsi more comfortable and enjoyable, since otherwise the cold will effect the person from the back and sides and the M-Korsi would not be comfortable. The back piece heater may be made from various heating means such as:
   a. Heating pad.
   b. Having heating source of its own as shown.
   c. Heating blanket.
   c. Any other heating means.

The unit shown in this figure has a seat, Seat that allows the person to seat on it and the seat is attached to the foot stand, Foot stand by use of bars shown at Lower bars. These parts all may have means of adjustments to allow their sizes to be controlled. The control means are not shown here to prevent from a crowded figure but are known arts for centuries.

Figure 6A:
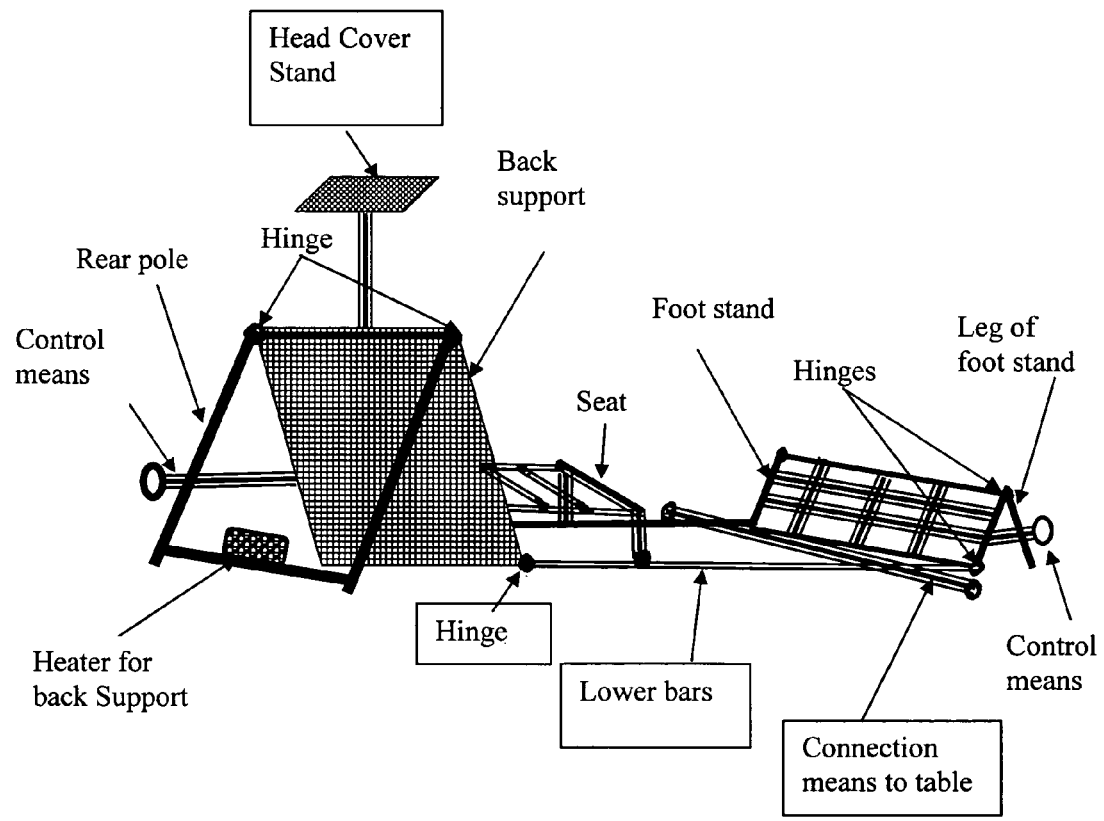
FIG. 6A. Shows a back stand as shown at FIG. 6 with a seating means that is adjustable and can be raised.

The back support will be attached to the table by use attachment means as shown in FIG. 6A.

FIG. 6A shows a unit similar to the one shown at previous FIG. 6 except in this unit the seat means is adjustable and it can be moved higher or lower from the floor or even tilted. This allows the person to chose its own comfort level. The unit will also use a cushion in order to have a comfortable seat. This unit has connection means, Connection means that allows this unit to be attached to the table means and be more secure.

Figure 9:
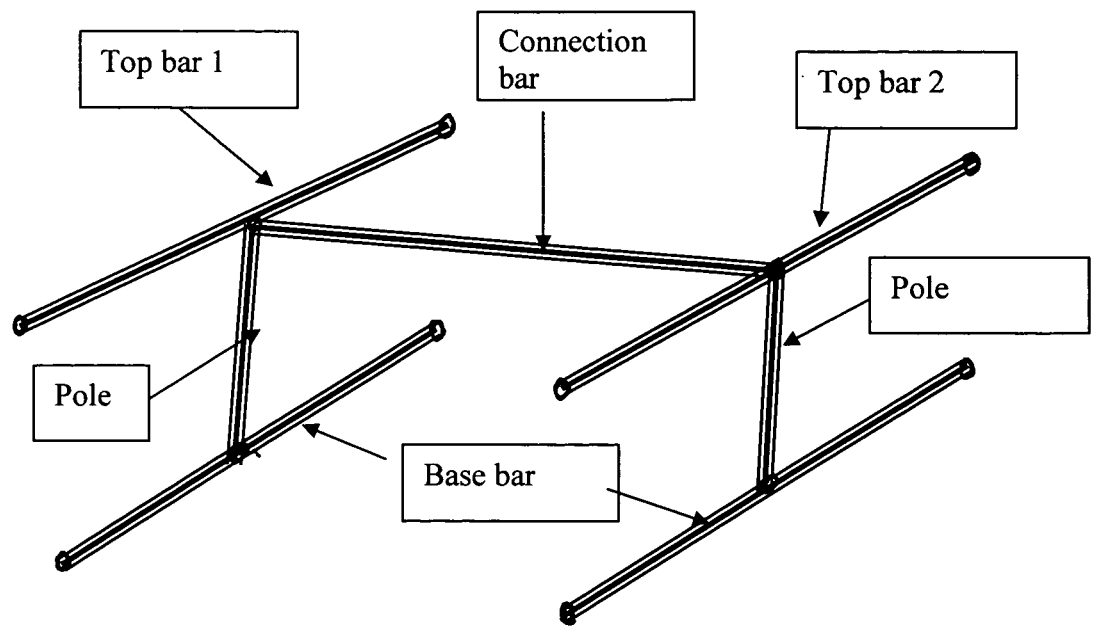
FIG. 9. Shows a modified version for use on the bed, in this model the table may have a U-shaped legs for holding the cover.
Figure 10:
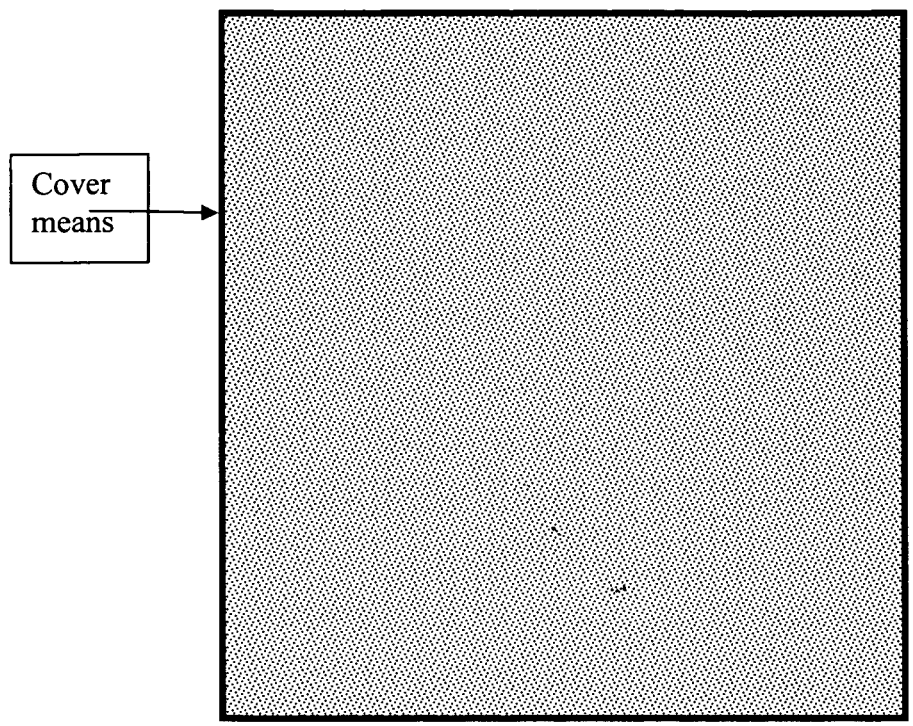
FIG. 10. Shows a cover means such as a blanket that goes over the table to contain the heat.

One essential part of the M-Korsi is a cover means symbolically shown at FIG. 10, which will go over or around the table means in order to contain the heat inside. This can be a blanket or a cover means with retardant layers or insulation means of any form that will prevents the heat from moving out. This cover means can be designed so that the parts which are not touching the person's body such as the sides and top to be heat-retardant and also to prevent heat escape, but the area which touches the person's body to have fabric lining and be non-irritant and comfortable. This cover may be placed on and around the table means or in some models it can be attached to the perimeter of the table as shown at FIG. 9. This option allows the cover means to be attached to the perimeter of the table means working desks and computer desks in order to keep the area covered space heated. The cover may be made from multiple pieces so that for example one piece may cover the table means and the second cover will go around the back means or the chair in order to fully cover the person's body and surrounding to keep the whole body of the person warm. Importantly, in some cases the unused sides of the table may be covered with a rigid layer such as metal or similar material.

FIG. 7 shows schematically a suction fan, Suction fan designed to suction the air from the covered space of the M-Korsi and move it by a hose into a tunnel which has a red hot element, Heating element, so that during this journey the molecules of the volatile gases will be burned out and the air will be purified and warmed.

A control means will also allow the suction fan to suck air from the covered area of the M-Korsi out in order to expel through use of a flexible hose to the proper space. The control means (not shown in this figure) will allow the heating means to be turned off for this purpose. Importantly, the function and the direction of the fan can be controlled by a control means which will be held outside the cover means. The change in the direction of the fan will allow the air to be moved in or out of the covered area and the heat to be on or off independently.

FIGS. 8 and 8A shows a modified version of the M-Korsi for use in computer tables, working desks etc. In this model, the desk shown at FIG. 8A has a border with a zone of attachment means such as loop fastener attachment means, ATM1 that allows a properly sizes, fire retardant fabric or any proper cover which will prevent from the transpassing of the heat such as the cover means shown at FIG. 8 to be attach to it on a detachable re-attachable basis. The cover means, shown at Retardant fabric has a zone of matching hook fastener attachment means, ATM2 that allows the border of the fabric to be attached to the perimeter of the desk on a detachable re-attachable basis. This system will create a cover which will keep the heat under the desk means. The cover may be further fortified by having a cover around the chair or on his/her shoulder which drops to the floor that will cover the body and the chair and will prevent heat from leaving the covered space. The covers for the chairs may be also attached to the desk on a detachable re-attachable basis to make a more efficient unit. The chair may have its own heating means.

The loop fastener attachment means, ATM1-A and ATM1-B allows the other covers such as the cover for the body to be attached to it on a detachable, re-attachable basis.

FIG. 9. Shows a modified version for use on the bed, in this model the table may have U-shaped legs for holding the cover and allowing the person to get in. This will be particularly useful in cases where the cover should not touch a person's skin in order to prevent burning or injury. The U-shaped legs may be also adjusted.

This unit may be also modified for use on baby/child cribs. In this model, the heater will be further modified in order to eliminate the chance of a child touching hot areas and by having alarms that prevent the heat from going over or under a certain temp. This alarm may be set in an area independent of the actual position of the thermostat. In a different model, the warmed air may be delivered to the crib through the heating means with hose shown at FIG. 7. The heated crib would secure heat for children in the age group where they may remove the blanket from their body or accidentally enwrap it around their necks. The heated crib will remove the need of heating of the whole room to a higher degree as earlier discussed.

FIG. 10. Shows a cover means that is in the shape of a blanket that will be placed over the table means in order to keep the heat in the covered space.

Figure 11:
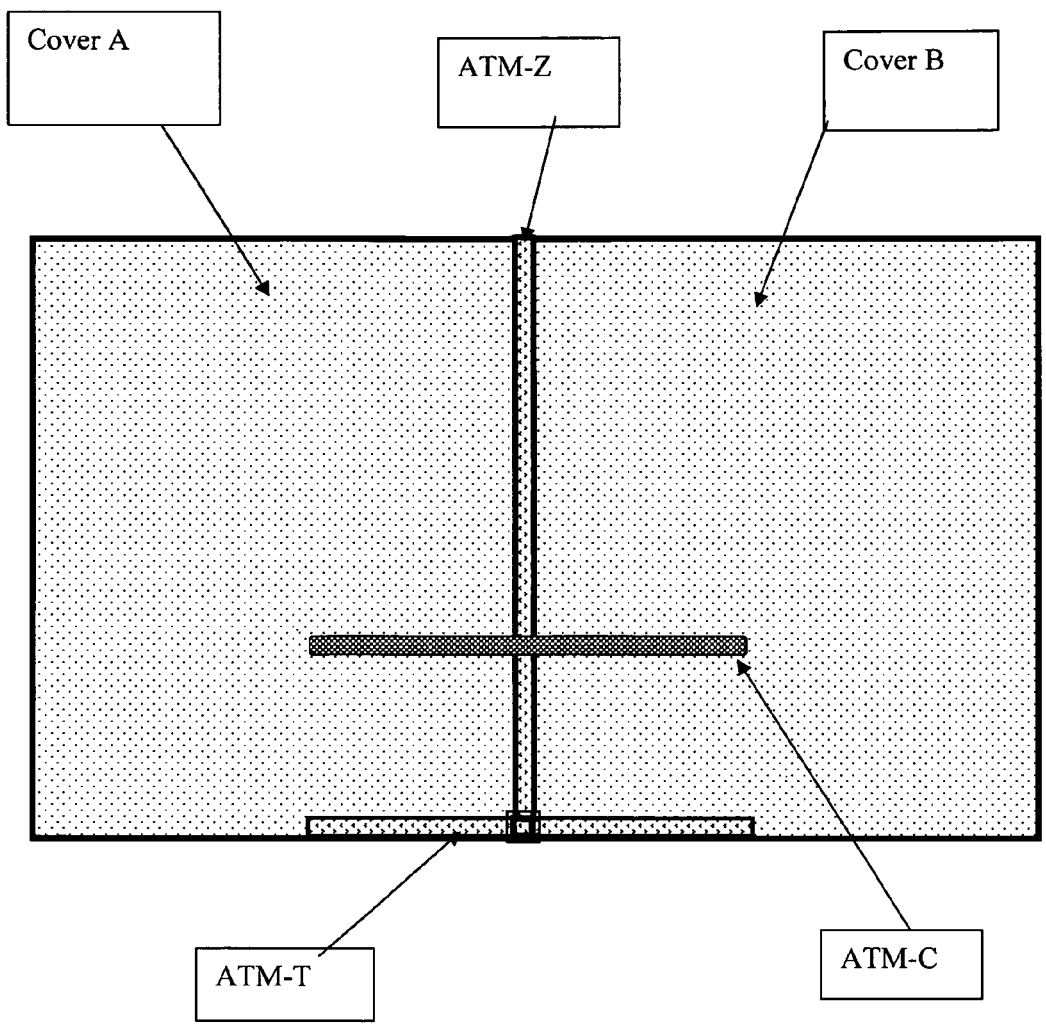
FIG. 11. Shows a cover means that is designed to cover the top and three sides of the table means.

FIG. 11. Shows a cover means, designed to cover the top and three sides of the table means. In this model the cover means consist of two smaller cover means, Cover A and Cover B that are attached to each other by the use of attachment means, ATM-Z so that the size of this unit can be adjusted. The cover means also have an attachment means, ATM-T that allows this zone of the cover means to be attached to the front border of the table means so that this cover means will cover the top and the three sides of the table means. The cover means also may have an attachment means, ATM-C in order to allow the front cover that is soft and non-irritant and will touch the body to be attached to the side covers and make a complete cover means. The means of attachment is not limited and they can be snaps, pins and other applicable attachment means.

Figure 12:
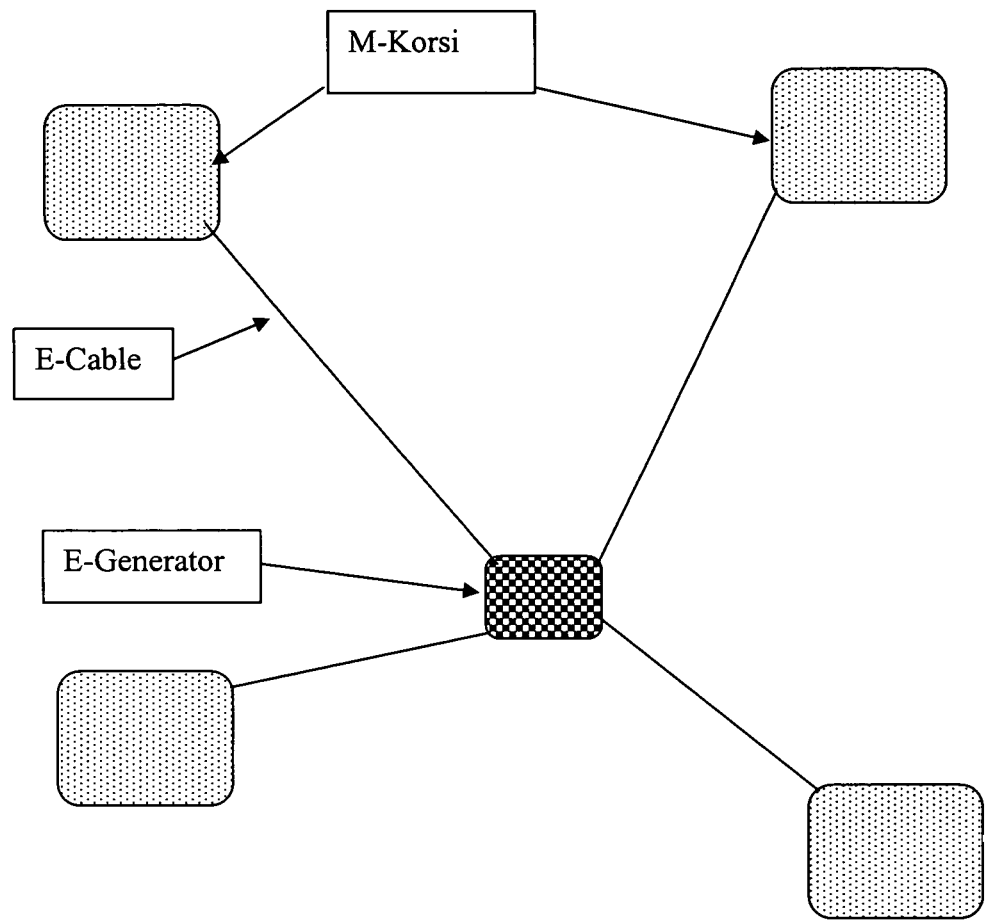
FIG. 12. Shows schematically four M-Korsis powered by an electrical generator used in a disaster area.

FIG. 12. Shows schematically the use of M-Korsis in a relief mission in a cold disaster areas. In this figure, an electrical generator, E-Generator is providing energy for four M-Korsis. The electricity is moved to the M-Korsis via electrical cables, E-Cable. In the mind of the applicant, this method can be utilized very effectively in saving human lives in cold disaster areas with a reasonable ease. Relief airplanes and helicopters can drop the units in the disaster area and can be assembled quickly for use. The applicant is not aware of any other current means that can be so safe, effective and rapid for such purpose.

Detailed Explanation of this Invention.

Coping with cold can be challenging and expensive, particularly when the need for energy is increasing and the supply of energy is getting limited or more expensive. Commonly, humans use larger heated spaces for living, however, this is not only expensive, but can be also difficult to tolerate when a person wants to inhale cooler air. The expense of heating limits or prevents the opening of the windows for allowing the fresh air to move in when it is cold, and also takes more time to heat a large space when the heat was turned down and the space was not in use for saving energy. In practice, a person coming from a cold weather area needs a source of warmth for warming up in a short time. Also imp, the applicant introduces how these units can be utilized for the very rapid delivery of heating aids to the disaster areas around the world and save many lives of the victims.

In the past, the idea of heating a limited space was available but the method is too primitive and not suitable for use in modern places. Thus, this applicant is providing his version of the method of a special versatile heating source and related method. This method consists of a table means that can be modified to fit the size of the users room and also adjustable heating means that will heat up the space under the table means when the table means is covered with a cover means. The user can sit on the side of this space and place his or her feet and lower body under the cover to warm up. In this method, the table means is versatile, user-friendly and allows its dimensions, width, length and height to be modified easily so that the user has the option of choosing a size that fits its need. The table means is also designed to be folded in order to be small and flat so that it can be easily stored under a bed or hung on the wall of a storage place. The table means uses an adjustable electrical heating means that will heat the space under the table when it is covered with a cover means. This unit is referred as the M-Korsi. The M-Korsi is an adjustable table means, which will be covered by a special cover and has a heating means that makes the covered area warm and allows the person to place his/her feet and most of the body under the covered space of the table and sit comfortably to study, watch TV or to use a computer, etc. It provides the means for supporting the back at a desired angle and also to place the feet against an adjustable stand, so that the person may sit comfortably.

The table means is equipped with a source of heating that is safe and will be secured on the table. The table is covered by a heat-retardant blanket in the areas that is not open and has a blanket to cover the user's body. Importantly, beside the fabric means, the sides on which the person does not sit can be closed off by a flexible or rigid layer such as metal, plastic or similar means in order to prevent heat escape.

The heating source has its control means which allows the temp to be adjusted and also has a thermostat which will control the heat in a desired safe level. Importantly, the unit also may have further means in order to control the air under the cover and eliminate the volatile gases that can be present in the limited space under the blanket.

This unit allows the user to sit in the side or even sleep under this unit or its side with reasonable comfort.

The Method of Providing a Rapid Relief to the Disaster Areas.

Unfortunately, man-made or natural disasters occur around the world and leaves many humans in need of heat. Addressing this issue is problematic and a rapid solution is not available to the best knowledge of this applicant. However, the applicant has designed a method for such use as shown in FIG. 12. This figure shows schematically an electrical generator, E-Generator which is providing energy for four M-Korsis. The electricity is moved to the M-Korsis by the electrical cables, E-Cable. Such help can be provided through the use of airplanes and helicopters by dropping the following:
1. Electrical generators of appropriate sizes.
2. Fuel for the electric generators.
3. Reasonable numbers of the properly packaged M-Korsis. These units include the whole system with blankets that will cover all surrounding and with covers that will prevent the heat from moving inside out.
4. Proper electrical connecting means, cables and lighting means.

By doing so the electrical generator will provide the electricity for the lights and also the energy for the users. As soon as the electrical generator is functional the lights can be used to help setting up the M-Korsis even in the middle of night and the heat will be provided in a very short time for the victims. They can be used for a long time until the final plan is available. These units can therefore be a life saver in those conditions. The applicant is not aware of any units that can be so effective and useful in those circumstances.

Use of Other Heat Means.

These units may be further fortified by means that are capable with retaining heat so that they can provide low grade heat for a period of time which the electricity will be gone.

Also imp, any other suitable means of heat may be used by these units.

The Advantage of these Units in Preserving the Nature.

Since the need for the heat is essential the people in need commonly will cut the wood and use it for making the heat. However, not only they are limited resources and a very valuable part of the nature, there are many other problems with that practice since the heat from burning wood has to be in open area, or in a ventilated unit, it is not controllable or manageable. These units, however, will provide the heat in a very controlled, comfortable, safe and reliable fashion, as the source of electricity can be from clean and endless sources such as atomic generators. By doing so, wood will be preserved and the environment itself will be less utilized.

Use of these Units in Difficult Areas.

These units can be even used safely in conditions, such as Alaska, inside the spaces covered with ice since the insulation will prevent from the deterioration of the space and can be of great help.

Head warming means of various kinds will be added to these units in order to keep the head and also the incoming air for breathing to be warmed so that even in the very cold temperatures the users can be comfortable. For this purpose the cover means will be extended to cover the head of the users and also with use of special extensions attached to the cover, the incoming air to be warmed before reaching the person. Various hood means also can be used for this purpose, so that the whole body and breathing air will be warmed. Thus this unit allows the persons to have a source of heat that can be set up easily, warm up quickly and to use minimal energy. It can also be stored in a very small space.

Importantly, the size, shape, the relative sizes and the other important characteristics of these unit may vary.

The invention claimed is:
1. A personal heating system comprising:
a table comprising a four-sided rectangular perimeter frame supporting a table top and vertical table legs at four corners of the perimeter frame for supporting the table top vertically above a horizontal support surface while providing openings between the table legs;
a cover covering the openings between the table legs to cover sides of a space underneath the table top;
a control means; and
an electric heater controlled by the control means for heating the space;
each side of the perimeter frame comprising a first bar and a second bar which can be slid lengthwise relative to each other to change the side's length;
each table leg being hinged to a lengthwise end of a respective first bar opposite the respective second bar to provide for the table leg to be folded toward the respective first bar; and
each second bar being hinged to the first bar of an adjoining side of the perimeter frame to provide for the second bar to be folded toward the first bar of the adjoining side about an axis which is perpendicular to the lengths of both the respective first bar and the respective second bar.

2. A personal heating system as set forth in claim 1 further comprising a foot stand disposed underneath the table top, a chair having a seat and a seat back, and structure joining the chair to the foot stand and the foot stand to a table leg.

3. A personal heating system as set forth in claim 2 further comprising a seat back heater for the seat back.

4. A personal heating system as set forth in claim 2 in which the seat back and the foot stand are each inclinable/reclinable relative to the seat.

5. A personal heating system as set forth in claim 1 wherein the control means comprises a control device which is exterior of the space and can be manually operated by a person using the heating system to control heat from the electric heater.

6. A personal heating system as set forth in claim 5 wherein the control means comprises a thermostat for sensing temperature within the space and limiting the amount of heat delivered by the electric heater.

7. A personal heating system as set forth in claim 5 wherein the control means comprises a timer for limiting the amount of time that the electric heater can remain on after having first been turned on.

8. A personal heating system as set forth in claim 1 further including an exhaust system for drawing exhaust out of the space underneath the table top.

9. A personal heating system as set forth in claim 8 in which the exhaust system comprises a hose extending from the space underneath the table top to a heating tunnel comprising an exhaust heating element and a suction fan operable to cause exhaust to pass through the exhaust heating element.

10. A personal heating system as set forth in claim 9 in which the suction fan is also operable to draw air from outside the space into the space.

11. A personal heating system as set forth in claim 1 in which the cover comprises an upper perimeter margin which is detachably/reattachably attached to the perimeter frame by a hook and loop fastening system comprising a piece of hook-type material continuously attached to one of the cover and the perimeter frame and a piece of loop-type material continuously attached to the other of the cover and the perimeter frame.

12. A personal heating system as set forth in claim 11 further comprising an additional cover for covering a portion of a person using the personal heating system external to the space and which is detachably/reattachably attached to the perimeter frame by a hook and loop fastening system comprising a piece of hook-type material attached to one of the additional cover and the perimeter frame and a piece of loop-type material attached to the other of the additional cover and the perimeter frame.

13. A personal heating system as set forth in claim 1 in which the table legs are vertically adjustable in height.

14. A personal heating system as set forth in claim 13 including mechanisms for locking the first and second bars of each side together at a desired length and for locking the table legs at desired heights.

15. A personal heating system as set forth in claim 1 in which the first and second bars of each side comprise right angle bars presenting surfaces on which the table top rests.

16. A personal heating system as set forth in claim 15 in which the table top comprises multiple top pieces, and further including support bars extending between sides of the perimeter frame providing underlying support for the multiple top pieces.

17. A personal heating system as set forth in claim 1 in which the electric heater comprises an electric light bulb, and the cover comprises a fire-retardant fabric.

18. A personal heating system for use in a disaster or an emergency comprising:
- components for erecting at least one table to provide a table top and table legs for supporting the table top vertically above a horizontal support surface while providing openings between the table legs;
- the at least one table having a four-sided perimeter frame;
- each table leg having a hinge connection to a respective side of the perimeter frame for folding the table leg toward the respective side of the perimeter frame;
- each side of the perimeter frame comprising a first bar and a second bar which can be slid lengthwise relative to each other to change the side's length;
- a hinge connection at each corner of the perimeter frame connecting together a first bar of one side and a second bar of an adjoining side for folding toward and away from each other about an axis perpendicular to lengths of the sides;
- a table top for fitting to the perimeter frame;
- a cover for covering the openings between the table legs of the at least one table to cover sides of a space underneath the table top of the at least one table
- a control means for the at least one table; and
- an electric heater for the at least one table controlled by the control means for heating the space underneath the table top of the at least one table, and
- a portable electric generator which is operable to provide electricity for operating the electric heater for the at least one table.

19. A personal heating system as set forth in claim 18 wherein the control means comprises a control device which is exterior of the space and can be manually operated by a person using the heating system to control heat from the electric heater.

\* \* \* \* \*